(12) United States Patent
Bich et al.

(10) Patent No.: US 10,689,117 B2
(45) Date of Patent: Jun. 23, 2020

(54) SEAT DEVICE

(71) Applicant: RECARO Aircraft Seating GmbH & Co. KG, Schwaebisch Hall (DE)

(72) Inventors: Christoph Bich, Abtsgmuend (DE); Felix Loisch, Stuttgart (DE); Andre Gaertner, Schwaebisch Hall (DE)

(73) Assignee: RECARO Aircraft Seating GmbH & Co. KG, Schwaebisch Hall (DE)

( * ) Notice: Subject to any disclaimer, the term of this patent is extended or adjusted under 35 U.S.C. 154(b) by 504 days.

(21) Appl. No.: 15/511,388

(22) PCT Filed: Sep. 16, 2015

(86) PCT No.: PCT/EP2015/071145
§ 371 (c)(1),
(2) Date: Mar. 15, 2017

(87) PCT Pub. No.: WO2016/041999
PCT Pub. Date: Mar. 24, 2016

(65) Prior Publication Data
US 2017/0259922 A1    Sep. 14, 2017

(30) Foreign Application Priority Data
Sep. 16, 2014  (DE) .......................... 10 2014 113 345

(51) Int. Cl.
*B64D 11/06*    (2006.01)
(52) U.S. Cl.
CPC ........ *B64D 11/062* (2014.12); *B64D 11/0624* (2014.12); *B64D 11/0639* (2014.12)

(58) Field of Classification Search
CPC .............. B64D 11/062; B64D 11/0624; B64D 11/0639; B64D 25/06
USPC ......................................... 244/122 B, 122 R
See application file for complete search history.

(56) References Cited

U.S. PATENT DOCUMENTS

| 2,556,077 | A | * | 6/1951 | Fetterly | .................. B64D 11/06 297/313 |
| 4,699,401 | A | * | 10/1987 | Saenz | ..................... B60R 22/00 224/602 |
| 5,248,187 | A | * | 9/1993 | Harrison | ................. B60R 22/30 297/468 |

(Continued)

FOREIGN PATENT DOCUMENTS

| DE | 102005005654 A1 | 8/2006 |
| DE | 202012100140 U1 | 4/2012 |

(Continued)

OTHER PUBLICATIONS

Office Action dated Dec. 21, 2017 issued in corresponding EP patent application No. 15766780.9 (and partial English translation).

(Continued)

*Primary Examiner* — Joshua E Freeman
(74) *Attorney, Agent, or Firm* — Posz Law Group, PLC

(57) ABSTRACT

A seat device with a seat, in particular a flight passenger seat, with a seat belt and with at least one functional unit which at least substantially differs from a functional opening and closing unit of the seat belt.
The at least one functional unit is at least connected to the seat belt and/or is at least partly integrated in the seat belt.

18 Claims, 4 Drawing Sheets

(56) References Cited

U.S. PATENT DOCUMENTS

Figure 1:
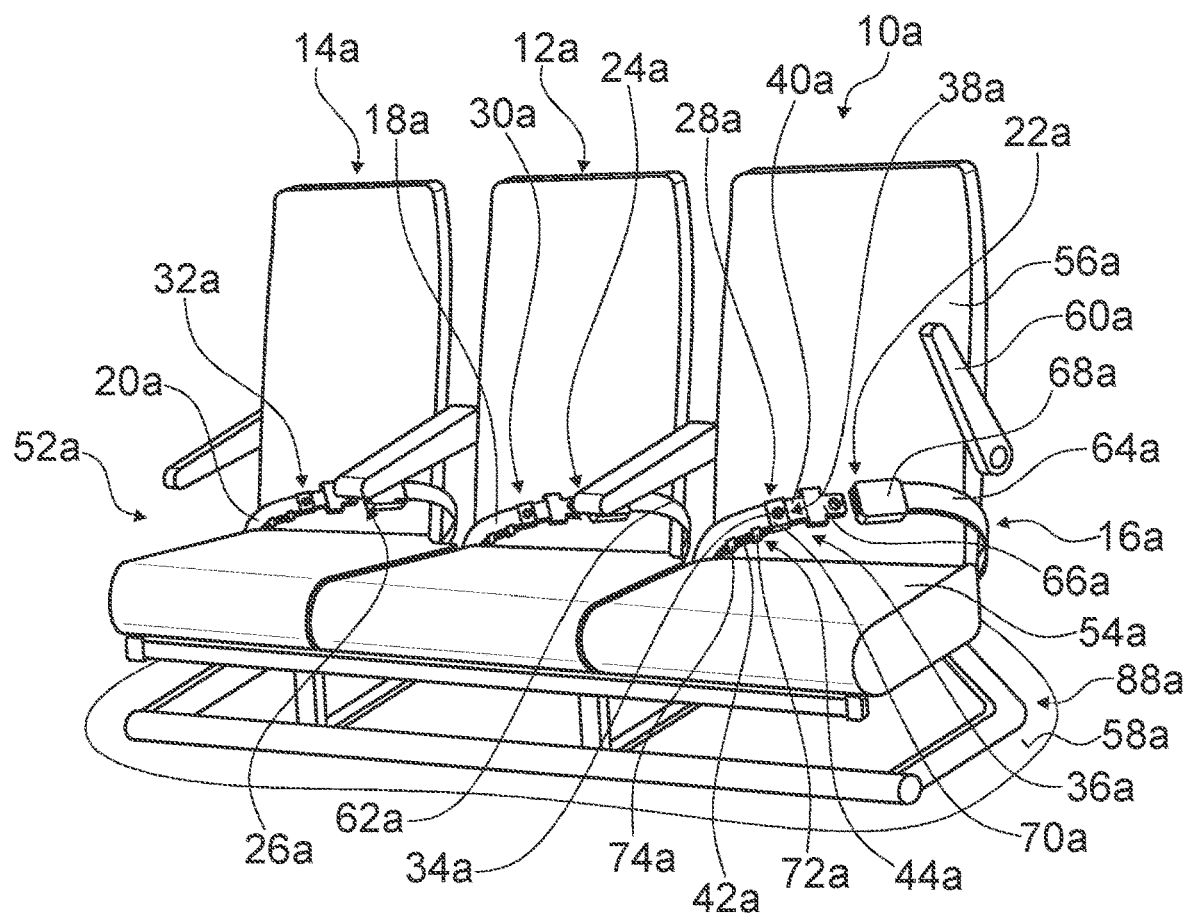

| | | | | | |
|---|---|---|---|---|---|
| 5,364,164 | A | * | 11/1994 | Kuranami | A47C 7/38 297/408 |
| 5,555,458 | A | * | 9/1996 | Large | B64D 11/0015 340/945 |
| 6,033,029 | A | * | 3/2000 | Henshall | B60R 22/105 280/801.1 |
| 6,367,882 | B1 | * | 4/2002 | Van Druff | B60R 22/12 297/467 |
| 6,402,251 | B1 | * | 6/2002 | Stoll | B60N 2/265 297/250.1 |
| 6,616,242 | B1 | * | 9/2003 | Stoll | B60N 2/265 297/250.1 |
| 7,501,597 | B2 | * | 3/2009 | Voltz | A47C 31/008 200/298 |
| 9,176,202 | B2 | * | 11/2015 | Baca | G01R 33/0047 |
| 9,821,680 | B2 | * | 11/2017 | Lange-Mao | B60N 2/0232 |
| 10,011,357 | B2 | * | 7/2018 | Margis | B60N 3/004 |
| 2001/0025400 | A1 | * | 10/2001 | Romca | B60N 2/688 24/31 R |
| 2003/0107210 | A1 | * | 6/2003 | Hsin | B60R 11/02 280/801.1 |
| 2004/0021349 | A1 | * | 2/2004 | Longtin | B64D 11/06 297/217.3 |
| 2004/0129543 | A1 | * | 7/2004 | Voltz | A47C 31/008 200/200 |
| 2006/0175882 | A1 | * | 8/2006 | Schweizer | B60N 3/004 297/217.3 |
| 2011/0108666 | A1 | * | 5/2011 | Pozzi | B64D 11/06 244/118.6 |
| 2012/0256403 | A1 | * | 10/2012 | Shields | B60R 22/48 280/733 |
| 2012/0259503 | A1 | * | 10/2012 | Settles | G05B 23/0256 701/31.5 |
| 2013/0009009 | A1 | * | 1/2013 | Islam | B60R 21/23184 244/121 |
| 2013/0187646 | A1 | * | 7/2013 | Baca | G01R 33/0047 324/262 |
| 2014/0354020 | A1 | * | 12/2014 | Meister | B60N 2/42727 297/216.1 |
| 2017/0259922 | A1 | * | 9/2017 | Bich | B64D 11/0624 |

FOREIGN PATENT DOCUMENTS

| | | |
|---|---|---|
| DE | 102012009625 A1 | 11/2013 |
| DE | 102013015008 A1 | 5/2014 |
| DE | 102013008059 A1 | 11/2014 |

OTHER PUBLICATIONS

Search Report dated May 8, 2015 issued in corresponding DE patent application No. 10 2014 113 345.5 (and partial English translation).
International Search Report dated Oct. 28, 2015 issued in corresponding international application No. PCT/EP2015/071145.
International Preliminary Report on Patentability (Chapter I) dated Mar. 30, 2017 issued in corresponding International application No. PCT/EP2015/071145.

* cited by examiner

SEAT DEVICE

CROSS REFERENCE TO RELATED APPLICATIONS

This application is a U.S. national stage application of PCT/EP2015/071145 filed on Sep. 16, 2015, which is based on German Patent Application No. 10 2014 113 345.5 filed on Sep. 16, 2014, the contents of which are incorporated herein by reference.

PRIOR ART

The invention relates to a seat device according to the preamble of patent claim 1.

A seat device with a seat, in particular a flight passenger seat, with a seat belt and with at least one functional unit differing from a functional opening and closing unit of the belt, has already been proposed.

The objective of the invention is, in particular, to render a generic device available, with improved characteristics regarding comfort and regarding easy operability for a passenger and regarding an advantageously simple implementation of a seat. The objective is achieved, according to the invention, by the features of patent claim 1, while advantageous embodiments and further developments of the invention may be gathered from the subclaims.

Advantages of the Invention

The invention is based on a seat device with a seat, in particular a flight passenger seat, with a seat belt and with at least one functional unit which at least substantially differs from a functional opening and closing unit of the belt.

It is proposed that the at least one functional unit is at least connected to the seat belt and/or is at least partly integrated into said seat belt. By a "flight passenger seat" is herein in particular a seat to be understood which is provided to be mounted in an airplane cabin of an airplane on a cabin floor, and on which a passenger can sit during a flight. Herein the flight passenger seat comprises a seat bottom and a backrest that is coupled with the seat bottom, wherein the backrest is preferably connected to the seat bottom in a pivotable fashion, resulting in the flight passenger seat being preferably movable into different functional positions. By a "seat bottom" is herein in particular an element to be understood which implements a seat surface of the flight passenger seat and on which the passenger sits during a flight, wherein the seat bottom preferably comprises at least one padding unit, which elastically cushions the seat surface. By a "seat belt" is herein in particular a retaining system on a seat to be understood wherein, in case of accelerations acting on the airplane, e.g. during turbulences or in case of a crash, a passenger sitting on the seat and strapped to the seat by means of the seat belt is held on the seat and is not thrown through the airplane. Herein the seat belt is connected to a bearing structure of the seat. The seat belt herein preferentially comprises a disconnection point in which the seat belt can be opened. The disconnection point is implemented by a functional opening and closing unit via which two sides of the seat belt are separably connected to each other. Herein the seat belt is preferably embodied of a fabric material having a high degree of tear resistance. Principally it is also conceivable that the seat belt is embodied as another kind of retaining system deemed expedient by someone skilled in the art, e.g. as a pivotable bracket which is lockable in a usage position, thus securing a passenger on the seat. By a "functional opening and closing unit" in particular is herein a unit to be understood which is implemented by at least one first connection element, which is connected to a first side of the seat belt, and a second connection element, which is connected to a second side of the seat belt, wherein the two connection elements may be fixedly coupled to each other and can be separated from each other by a passenger manually. In a connected state, a major force is transferable via the connection elements, as a result of which a passenger is held on the seat by the seat belt even in case of major accelerations. Herein a "functional unit" is in particular to mean a unit consisting of one or several elements and provided to implement and/or make available a function of the seat. It is herein conceivable that a function of the seat is operated by the functional unit or that the functional unit itself implements a function of the seat or a function for the seat. The phrase that "the functional unit differs at least substantially from the functional opening and closing unit" is herein in particular to mean that the functional unit does not substantially contribute to an opening function or closing function of the functional opening and closing unit. Herein the functional unit is in particular not provided for a connection of two sides of the seat belt. Herein it would be principally conceivable that at least a portion of the functional unit is connected to the functional opening and closing unit. "Connected" is herein in particular to mean rigidly and fixedly or displaceably connected to an element, e.g. in particular the seat belt, which is in particular to mean directly connected to the element, e.g. in particular the seat belt. Herein an element may be connected to the seat belt in such a way that it is releasable or that it is not releasable in a non-destructive manner. Herein an element, e.g. in particular the functional unit, may be connected to, i.e. feature a connection to the seat belt in a form-fit and/or force-fit manner and/or by substance-to-substance bond. Preferably an element, e.g. in particular the functional unit, is connected to the seat belt directly, wherein the functional unit is arranged together with the seat belt, and preferably arranged movably with respect to other elements of the seat device, e.g. a backrest or an armrest. The phrase "at least partly integrated" is herein in particular to mean that at least a portion of the functional unit is embodied in a one-part implementation with the seat belt and/or is accommodated within the seat belt. Herein it is conceivable that an entire structural component of the functional unit or just a portion of a structural component of the functional unit is integrated in the seat belt. As a result of this, a function of the seat can advantageously be mounted to and/or integrated in the seat belt, thus in particular also allowing advantageously simple and cost-saving implementation of structural components in which a functional unit is mostly arranged in the prior art, e.g. in particular an armrest. By implementation according to the invention advantageously a seat may be made available that features especially advantageous comfort and a particularly ergonomic operation for a passenger and which may further advantageously be embodied in a simple manner.

It is further proposed that the at least one functional unit is embodied as an operating unit comprising at least one operating element. By an "operating unit" is herein in particular a unit to be understood which is provided for operating an element or a device, in particular for operating an element or a device of the seat. By an "operating element" is in particular an element to be understood which is provided for receiving in an operating process an input parameter from an operator and for being contacted, in particular directly contacted by an operator, wherein touching of the operating element is sensed and/or an actuating force applied to the operating element is sensed and/or is mechanically transferred for actuating a unit. The operating element is herein preferably embodied as a press button which is operable from one side by applying a pressure. Principally it is also conceivable that the operating element is embodied as a press button which is operable by applying pressure from two sides, i.e. by pressing together. Principally it is also conceivable that the operating element is embodied as a rotary element which is operable by applying a torque and which is turned in an operating process. In this way the functional unit may be embodied in a particularly advantageous manner.

Furthermore it is proposed that the at least one functional unit comprises a holding device connecting the functional unit to the seat belt. By a "holding device" is herein in particular a device to be understood which is coupled with the seat belt and is, at least in a fully mounted state, connected to the operating element by form-fit and/or force-fit implementation and/or by substance-to-substance bond. This allows advantageously connecting the functional unit to the seat belt.

It is also proposed that the holding device is connected to the seat belt in such a way that it is displaceable. "Connected in such a way that it is displaceable" is herein in particular to mean that the holding device is displaceable along the seat belt. As a result of this, the holding device—and thus the operating element—may advantageously be displaced by a passenger along the seat belt and may be brought to a position he desires in which the operating element is advantageously operable or, for example, not bothersome.

Moreover it is proposed that the holding device is arranged on a fixed side of the seat belt. By a "fixed side of the seat belt" is herein, in particular, a side of the at least two-part seat belt to be understood which is not modifiable in length between an end that is fixated to the seat and an end to which a connection element of the seat belt is fixedly mounted. The seat belt herein has a variable side, which is fixedly arranged on a side of the seat that is situated opposite a side on which the fixed side of the seat belt is fixedly connected and the length of which is modifiable between the end that is fixedly connected to the seat and a connection element provided for coupling with the connection element of the fixed side, for the purpose of being adaptable to passengers of different sizes. In this way a particularly simple connection of the holding device, and in particular of the operating element, to the seat belt is achievable as it is not necessary to pay attention to an adjustment of a belt length during operation.

Beyond this it is proposed that the holding device is fixedly connected to the seat belt. "Fixedly connected to the seat belt" is herein in particular to mean that the holding device is connected to the seat belt stationarily and is not displaceable with respect to the seat belt. This allows implementing the holding device in an especially advantageous fashion.

It is moreover proposed that the at least one functional unit comprises at least one transfer element for a coupling of the operating element with an element that is to be triggered and is coupled with the seat belt. By a "transfer element" is herein in particular an element to be understood which is provided to transfer an operating signal and/or operating force originating from the operating element and provided to actuate an element that is to be triggered. Herein the transfer element may be an element for transferring electrical and/or electronic signals, e.g. in particular a cable, or an element for transferring a force and/or movement, e.g. in particular a Bowden wire. Principally it is herein also conceivable that the transfer element is embodied of other materials, e.g. of textiles, of carbon fibers, of differently implemented natural or synthetic fibers as well as composite materials. Herein a "coupling of the operating element with an element that is to be triggered" in particular means a connection between the operating element and the element that is to be triggered, via which a possible actuation of the operating element is transferred to the element to be triggered, resulting in and/or implementing a corresponding reaction. By an "element that is to be triggered" is herein in particular an element to be understood which can be operated by an operator via the operating element, e.g. a seat electronics, a seat adjustment or other elements or devices of a seat, in particular a flight passenger seat, which are deemed expedient by someone skilled in the art. In this way transfer from the operating element to the element that is to be triggered may be advantageously effected and the transfer element may herein be integrated in the seat in a manner that is advantageous and not bothersome.

It is also proposed that the at least one functional unit comprises at least one guidance connecting the transfer element to the seat belt. By a "guidance" is herein in particular a guidance to be understood in which a transfer element, e.g. a Bowden wire or a cable, is at least partly accommodated, wherein it is principally conceivable that the transfer element is, in a circumferential direction, only partly encompassed by the guidance or that the transfer element is, in a circumferential direction, completely encompassed by the guidance. Herein the transfer element is preferably accommodated by the guidance over an entire length between the operating element and the element that is to be triggered. As a result of this, the transfer element is connectable to the seat belt in an advantageous and easy manner.

Furthermore it is proposed that the guidance is embodied as a guiding element which is implemented separate from the seat belt and is connected to the seat belt. By a "guiding element that is implemented separate from the seat belt" is herein in particular a guiding element to be understood which is embodied separate from the seat belt, e.g. a plastic tube, and is connectable to the seat belt on an outside. Herein it is conceivable that the guiding element is partially connected to the seat belt and is, for example, clippable to the seat belt via latch elements or is coupled to the seat belt in other ways deemed expedient by someone skilled in the art. This advantageously allows achieving a cost-effective and advantageously add-on capable guidance.

It is further proposed that the guidance is embodied as a guiding element integrated in the seat belt. By a "guiding element integrated in the seat belt" is herein in particular a guiding element to be understood which is in particular embodied in a one-part implementation with the seat belt, in particular as a hollow space implemented by the seat belt. This allows implementing the guidance in a fashion that is especially advantageous and is not bothersome for a passenger.

Moreover it is proposed that the operating element is embodied as a pull element. By a "pull element" is herein in particular an element to be understood which has to be pulled by an operator for actuation in order to transfer an actuation signal and/or actuation force. In this way the operating element may be embodied in such a way that it is particularly simple and is operable by a passenger in a particularly simple and intuitive fashion.

Beyond this it is proposed that the operating element is embodied as a mechanical press button. By a "mechanical press button" is herein in particular a press button to be understood which transfers a mechanical actuation signal, e.g. a force for actuating an element that is to be triggered, via actuation, i.e. via a pressure force acting onto an actuation surface of the operating element. In this way a particularly advantageous and simple operating element may be made available and mechanical components of the seat are actuatable via the functional unit.

It is also proposed that the operating element is embodied as an electrical operating element. By an "electrical operating element" is herein in particular an operating element to be understood which, when actuated by an operator, outputs and/or modulates an electrical and/or electronic signal for operating an electrical and/or electronic structural element. This advantageously allows controlling an electronics unit of the seat via the functional unit.

Further it is proposed that the seat belt embodies the operating element and the transfer element in a one-part implementation and is provided for triggering a spring element for seat adjustment. By a "spring element for seat adjustment" is herein in particular a spring element to be understood, e.g. an adjustable gas pressure spring, which in at least one state, in particular a non-actuated state, locks the seat in a seat position and unlocks the seat in an actuated state, thus allowing the seat to be adjustable in its seat position by a passenger. "Provided" is herein in particular to mean specifically designed and/or equipped. By an object being provided for a certain function is in particular to be understood that the object fulfills and/or implements said certain function in at least one application state and/or operation state. A "seat adjustment" is herein in particular to mean an adjustment of the seat between a TTL and a comfort position, wherein the one seat adjustment may principally also comprise an adjustment of a leg support. In this way a seat adjustment may be realized in a particularly simple fashion without additional elements.

Furthermore it is proposed that the operating element is provided for actuating a seat adjustment. "For actuating a seat adjustment" is herein in particular to mean that an adjustment mechanism by which a seat adjustment is effected can be actuated via actuating the operating element. In this way an operating element for adjusting the backrest may advantageously be integrated in the seat belt, respectively may be connected to the seat belt, as a result of which in particular an armrest, in which the corresponding operating element is preferably arranged in the prior art, may be implemented in a more lightweight fashion and advantageously smaller.

It is moreover proposed that the functional unit comprises at least one plug element. By a "plug element" is herein in particular an element to be understood which is connectable to another plug element and is provided for connecting a device, e.g. in particular an input device, output device or memory device. A connectable device may herein be implemented, for example, as an earphone or as a USB flash stick. The plug element may herein be implemented, in accordance with the device that is to be connected, e.g. as a USB plug, as a 3.5-mm jack-plug or as another plug element that is deemed expedient by someone skilled in the art. This allows a passenger to connect further devices to the seat via the functional unit in an advantageous and easy fashion.

It is also proposed that the functional unit comprises at least one stowage element. By a "stowage element" is herein in particular a storage element to be understood, in which a passenger may stow utensils, preferably small utensils, e.g. a smartphone or an MP3 player. The stowage element may herein be embodied, for example, as a closable pocket, which is implemented, for example, of a textile material. Thus elements may advantageously be stowed in or on the seat belt via the functional unit.

The seat device according to the invention is herein not to be restricted to the application and implementation described above. In particular, to fulfill a functionality herein described, the seat device according to the invention may comprise a number of respective elements, structural components and units that differs from the number herein mentioned.

DRAWINGS

Further advantages may be gathered from the following description of the drawings. In the drawings six exemplary embodiments of the invention are shown. The drawings, the description and the claims contain a plurality of features in combination. Someone skilled in the art will purposefully also consider the features separately and will find further expedient combinations.

It is shown in:

FIG. 1 a schematic presentation of a seat device according to the invention with a seat in a seat row.

Figure 2:
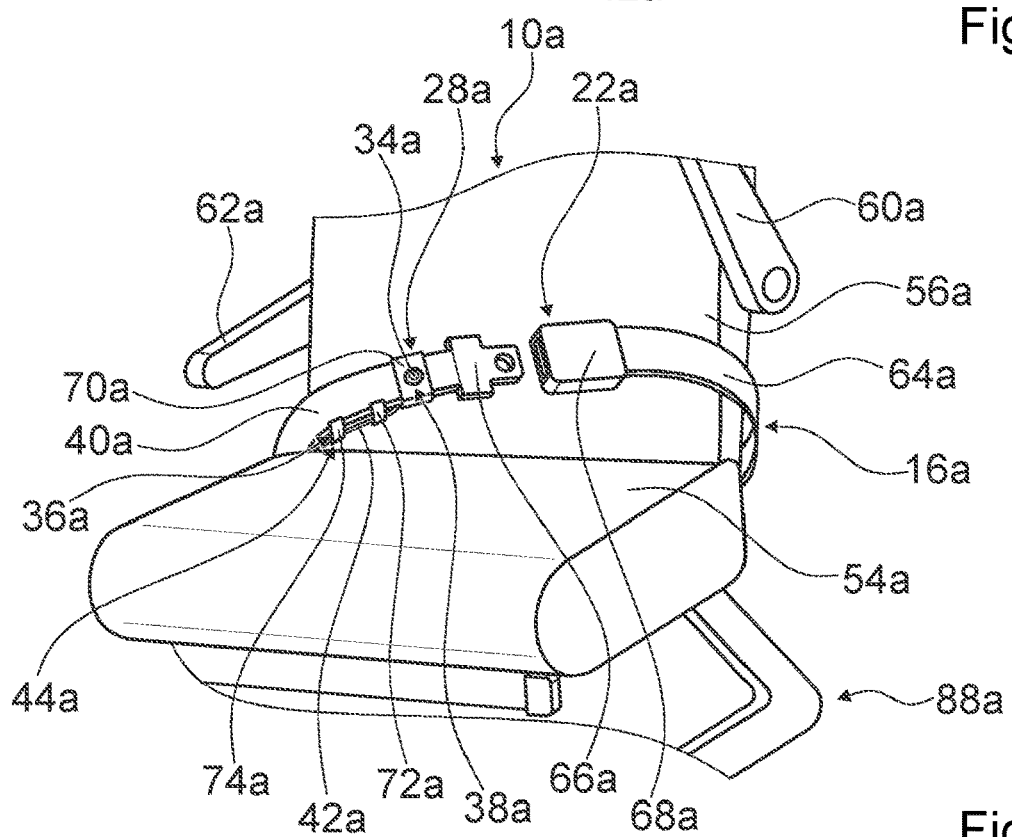
Figure 3:
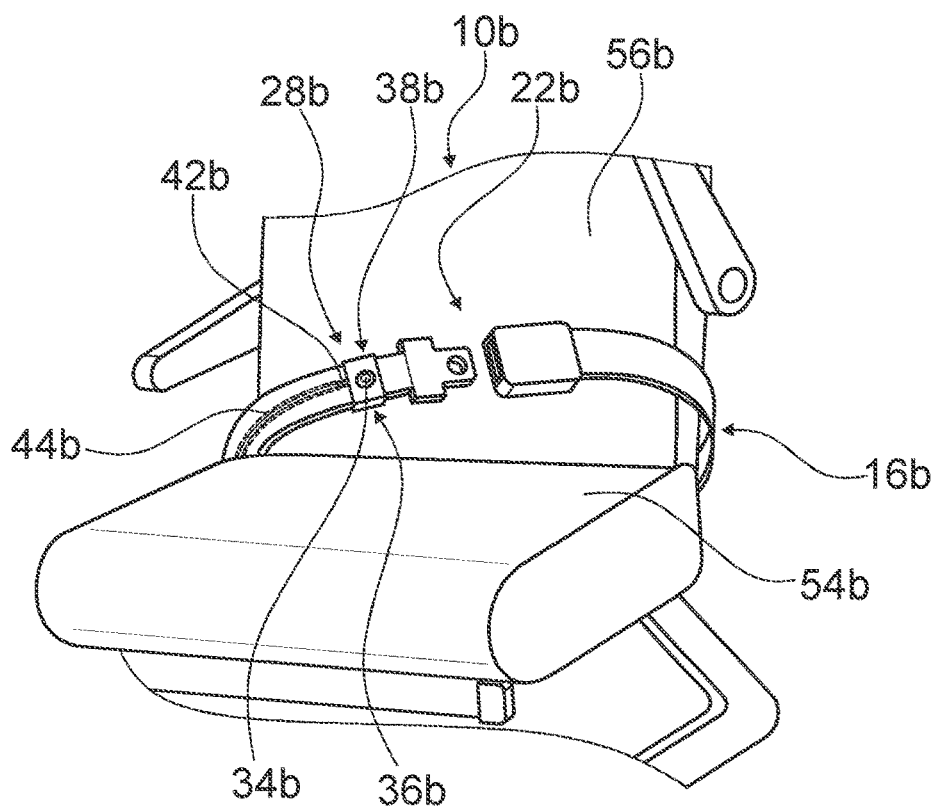
Figure 4:
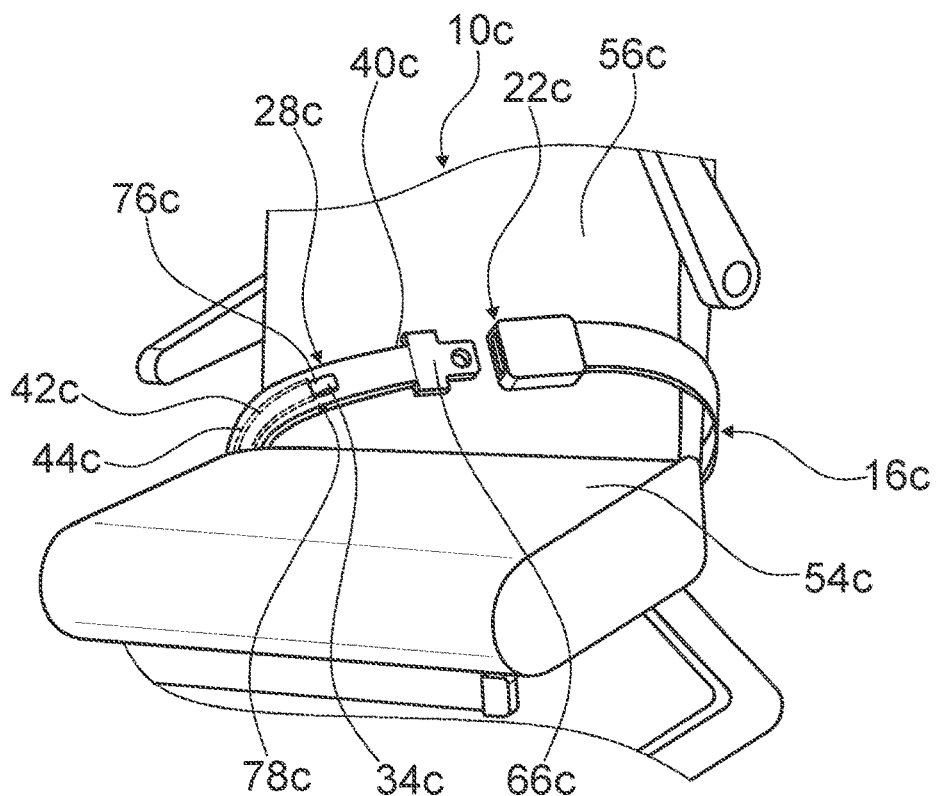
Figure 5:
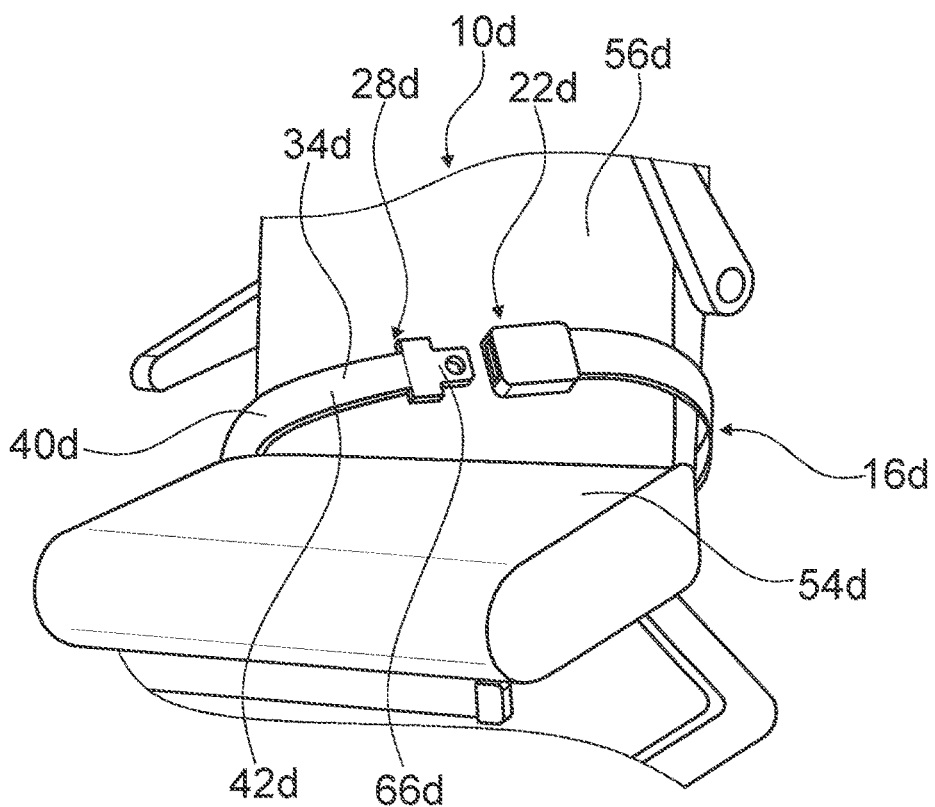
Figure 6:
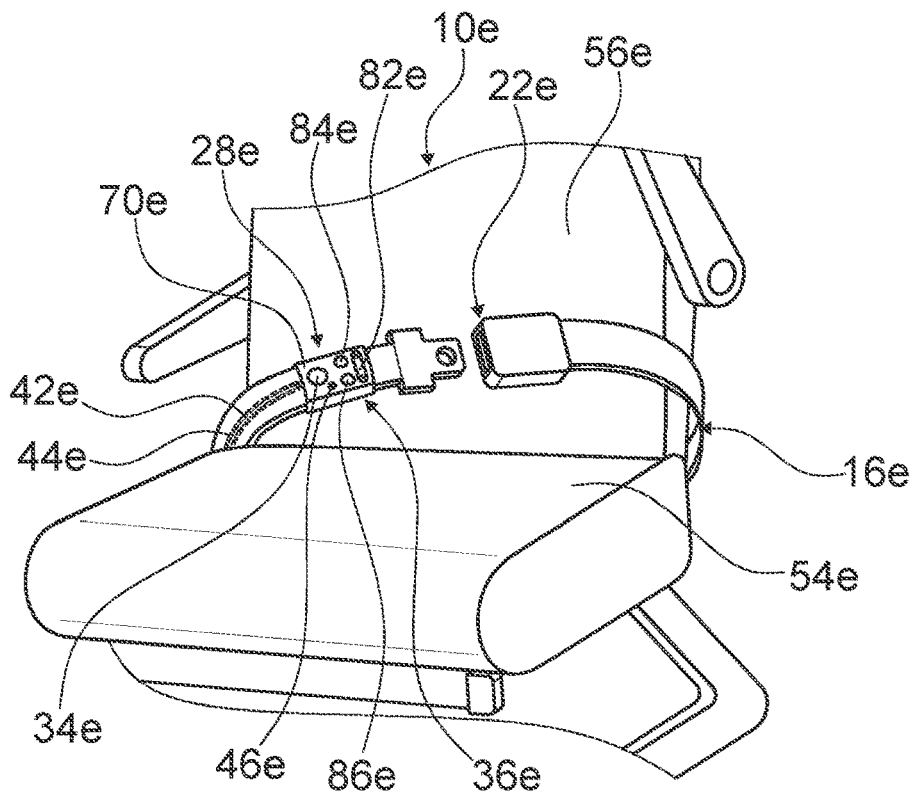
Figure 7:
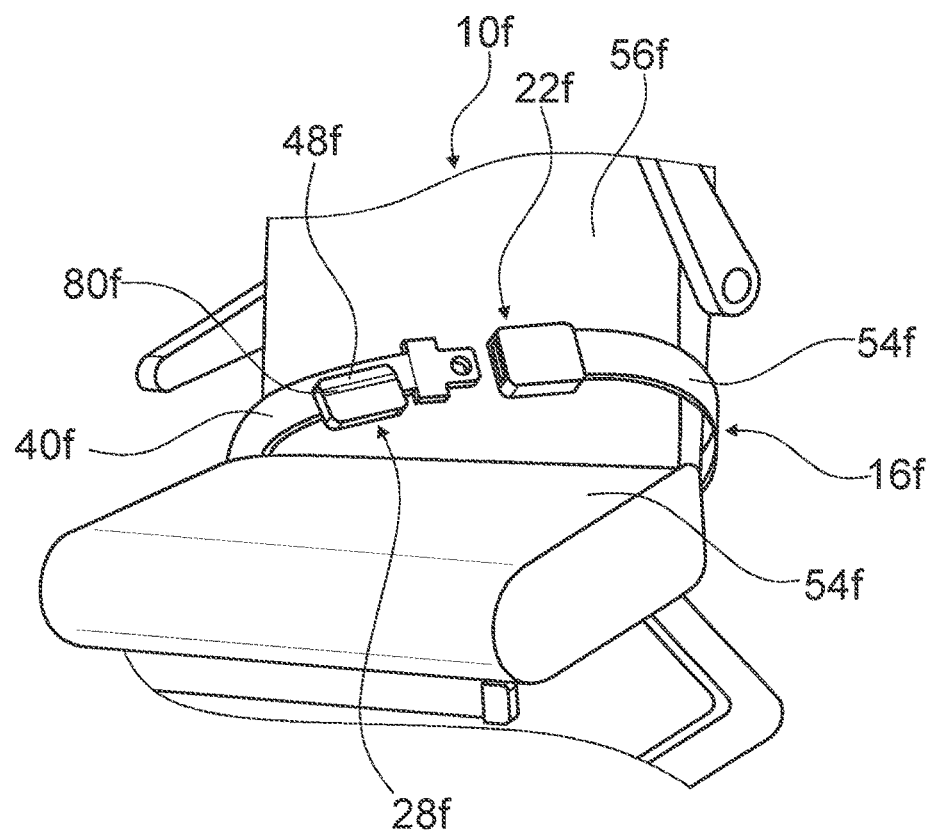
Figure 8:
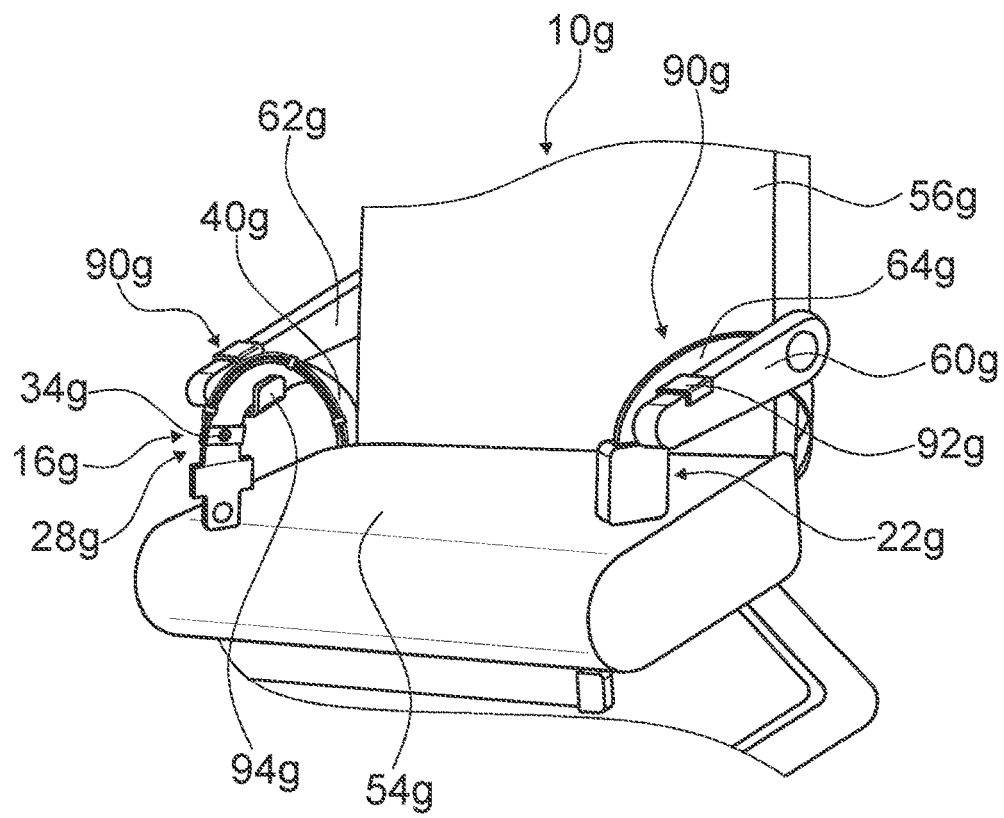

FIG. 2 a schematic presentation of a seat belt of the seat device according to the invention FIG. 3 a schematic presentation of a seat device according to the invention in a second exemplary embodiment, FIG. 4 a schematic presentation of a seat device according to the invention in a third exemplary embodiment, FIG. 5 a schematic presentation of a seat device according to the invention in a fourth exemplary embodiment, FIG. 6 a schematic presentation of a seat device according to the invention in a fifth exemplary embodiment, FIG. 7 a schematic presentation of a seat device according to the invention in a sixth exemplary embodiment, and FIG. 8 a schematic presentation of a seat device according to the invention in a seventh exemplary embodiment.

DESCRIPTION OF THE EXEMPLARY EMBODIMENTS

FIGS. 1 and 2 show a seat device according to the invention in a first exemplary embodiment. The seat device comprises a first seat 10a. The seat device further comprises a second seat 12a and a third seat 14a. The seats 10a, 12a, 14a are together implemented as a seat row 52a. The seats 10a, 12a, 14a are implemented as flight passenger seats. The seats 10a, 12a, 14a are mounted in an airplane cabin (not shown in detail) of an airplane. For this purpose, the seats 10a, 12a, 14a feature a mounting unit 88a, which mounts the seats 10a, 12a, 14a together on a cabin floor 58a of the airplane cabin. Principally it is also conceivable that the seats 10a, 12a, 14a are each mounted separately. The seats 10a, 12a, 14a, which are embodied as flight passenger seats, are embodied substantially identically, which is why in the following only the seat 10a is described in detail. The seat 10a, which is embodied as a flight passenger seat, comprises a seat bottom 54a and a backrest 56a which is pivotably coupled with the seat bottom 54a. Herein the seat 10a is adjustable between a TTL position and a comfort position. The TTL position herein constitutes an upright seat position, in which the backrest 56a is oriented substantially orthogonal to the cabin floor 58a and the seat bottom 54a is oriented substantially parallel to the cabin floor 58a. The comfort position constitutes an inclined seat position, in which the backrest 56a and the seat bottom 54a are oriented inclined with respect to the cabin floor 58a. Herein the backrest 56a and the seat bottom 54a are in an adjustment between the TTL position and the rest position pivoted with respect to each other and to the cabin floor 58a. Herein the seat bottom 54a and the backrest 56a are adjustable or only the seat bottom 54a or the backrest 56a respectively. Principally it is also conceivable that the seats each comprise a leg support which is also adjustable between the TTL position and the comfort position. Herein the seat 10a is continuously adjustable between the TTL position and the comfort position. For a seat adjustment of the seat 10a between the TTL position and the comfort position, the seat 10a comprises an adjustment mechanism (not shown in detail). The adjustment mechanism is embodied as a recline cinematic. The seat bottom 54a and the backrest 56a are coupled to each other via the adjustment mechanism. The adjustment mechanism comprises a spring element. The spring element is embodied as a continuously adjustable gas pressure spring. In a non-actuated state the spring element, which is embodied as a gas pressure spring, blocks the adjustment mechanism, as a result of which the seat bottom 54a and the backrest 56a are locked in the respective position they are taking with respect to each other. In an actuated state the spring element, which is embodied as a gas pressure spring, unblocks the adjustment mechanism, as a result of which the seat bottom 54a and the backrest 56a can be adjusted by a passenger sitting on the seat 10a. Herein the passenger may, with the adjustment mechanism unblocked, adjust the seat 10a by shifting weight and may pivot the backrest 56a with respect to the seat bottom 54a. The seat 10a further comprises armrests 60a, 62a, which are respectively arranged laterally next to the seat bottom 54a. The armrests 60a, 62a are each pivotably connected to seat dividers (not shown in detail) of the seat 10a.

For securing passengers sitting on the seats 10a, 12a, 14a, the seat device comprises respectively one seat belt 16a, 18a, 20a. The seat belts 16a, 18a, 20a are each fixedly connected to the respective seat 10a, 12a, 14a. In a closed state the seat belts 16a, 18a, 20a span across the respective seat bottom 54a of the respective seat 10a, 12a, 14a. For opening and closing the seat belts 16a, 18a, 20a, each of the seat belts 16a, 18a, 20a comprises respectively one functional opening and closing unit 22a, 24a, 26a. In the following only the seat belt 16a, which is allocated to the seat 10a, with its functional opening and closing unit 22a will be described. The remaining seat belts 18a, 20a of the seats 12a, 14a are with their functional opening and closing units 24a, 26a embodied substantially identically. The seat belt 16a is implemented of a tear-resistant fabric. Principally it is also conceivable that the seat belt 16a is implemented of a different material which is deemed expedient by someone skilled in the art. The seat belt 16a comprises a first fixed side 40a and a second variable side 64a. In a closed state the fixed side 40a and the variable side 64a of the seat belt 16a are fixedly connected to each other via the functional opening and closing unit 22a. The fixed side 40a of the seat belt 16a is fixedly connected to the seat 10a with a first end. Via connection of the fixed side 40a of the seat belt 10a, a force can herein be transferred into the seat 10a, respectively into the mounting unit 88a of the seat 10a. The functional opening and closing unit 22a comprises a first connection element 66a and a second connection element 68a which are provided to be fixedly connected to each other for closing the seat belt 16a. The first connection element 66a is fixedly connected to a second end of the first fixed side 40a of the seat belt 16a. The first connection element 16a is fixedly connected to the second end of the first fixed side 40a of the seat belt 16a via a form-fit connection. Herein a length of the first fixed side 40a of the seat belt 16a is unchangeable. The length of the fixed side 40a, that is a distance between the first end, in which the fixed side 40a is connected to the seat 10a, and the second end, in which the first connection element 66a is connected to the fixed side 40a, is not adjustable and is fix. The variable side 64a of the seat belt 16a is fixedly connected to the seat 10a with a first end. Herein the first end of the variable side 64a is arranged on a side of the seat bottom 54a which is situated opposite the side on which the first end of the fixed side 40a is connected. On the variable side 64a the second connection element 68a of the functional opening and closing unit 22a is connected. Herein the second connection element 68a of the functional opening and closing unit 22a is arranged in such a way that it is displaceable along the seat belt 16a. By way of the displaceable arrangement of the second connection element 68a of the functional opening and closing unit 22a on the second side 64a, a length of the second side 64a is variable. A distance between the first end of the second side 64a and the second connection element 68a of the functional opening and closing unit 22a is variable and can be adjusted by a passenger manually.

The seat device comprises per seat 10a, 12a, 14a one functional unit 28a, 30a, 32a. Each functional unit 28a, 30a, 32a is respectively allocated to the corresponding seat 10a, 12a, 14a, which is embodied as a flight passenger seat. The functional units 28a, 30a, 32a are herein implemented differently from the corresponding functional opening and closing units 22a, 24a, 26a of the corresponding seat belt 16a, 18a, 20a of the respective seat 10a, 12a, 14a. The functional units 28a, 30a, 32a are embodied separate from the respective functional and closing unit 22a, 24a, 26a of the corresponding seat belt 16a, 18a, 20a and do not contribute to an opening and closing of the corresponding seat belt 16a, 18a, 20a. The functional units 28a, 30a, 32a are herein connected to the seat belt 16a, 18a, 20a of the respective seat 10a, 12a, 14a. Herein the functional units 28a, 30a, 32a are respectively connected to the corresponding seat belt 16a, 18a, 20a. The functional units 28a, 30a, 32a are herein connected to the respective seat belt 16a, 18a, 20a via a form-fit connection. In the following only the functional unit 28a and its connection to the seat belt 16a of the seat 10a will be described in detail. The remaining functional units 30a, 32a are embodied substantially identically and are respectively connected to the corresponding seat belt 18a, 20a in a same fashion. The following description is therefore applicable to said functional units 30a, 32a as well.

The functional unit 28a is embodied as an operating unit. Via the functional unit 28a, which is embodied as an operating unit, a passenger sitting on the seat 10a can operate at least part of a function of the seat 10a, which is embodied as a flight passenger seat. The functional unit 28a, which is embodied as an operating unit, comprises an operating element 34a. The operating element 34a is provided to be actuated by a person, in particular by the passenger sitting on the seat 10a. The operating element 34a is implemented as a mechanical press button. The operating element 34a is embodied as a recline button 38a. Via the operating element 34a, which is embodied as a recline button 38a, a recline function of the seat 10a can be operated. Via the operating element 34a the adjustment mechanism, which is not shown in detail, is actuated for adjusting the seat 10a. While the operating element 34a is actuated, the adjustment mechanism, which is not shown in detail, is unblocked and the seat 10a can be adjusted. While the operating element 34a is not actuated, the adjustment mechanism, which is not shown in detail, is blocked and the seat 10*a* is locked in the respective position.

The functional unit 28*a* comprises a holding device 36*a*. In a mounted state the holding device 36*a* connects the operating element 34*a* of the functional unit 28*a* to the seat belt 16*a*. The holding device 36*a* is herein connected to the seat belt 16*a* in such a way that it is displaceable. The holding device 36*a* comprises a base body 70*a*. The base body 70*a* is implemented of a synthetic material. The base body 70*a* features a rectangular cross section with rounded edges. Principally it is also conceivable that the base body 70*a* has a different cross section, e.g. an oval cross section. The base body 70*a* is herein embodied annulus-shaped. The base body 70*a* of the holding device 36*a* herein completely encompasses the seat belt 16*a* in a plane. The seat belt 16*a* is in a mounted state guided through an opening of the base body 70*a*. In a mounted state the base body 70*a*, and thus the holding device 36*a*, cannot be separated from the seat belt 16*a*. For this purpose the seat belt 16*a* comprises, on its second end, on which the first connection element 66*a* is attached, a blocking element which prevents a further displacement of the base body 70*a* and thus a separation of the base body 70*a* from the seat belt 16*a*. Herein the blocking element is implemented by the connection element 66*a*. Principally it is also conceivable that the blocking element is embodied as a separate element, e.g. as a pin element connected to the seat belt 16*a* or as a bump arranged on the seat belt 16*a*. On account of the blocking element, the holding device 36*a* on the second end cannot slip from the seat belt 16*a*. On the first end, in which the seat belt 16*a* is connected to the seat 16*a*, the holding device 36*a* cannot slip from the seat belt 10*a* either. Herein the holding device 36*a* is arranged on a fixed side 40*a* of the seat belt 16*a*. Principally it would also be conceivable that the holding device 36*a* is arranged on the variable side 64*a*. In this case, an additional effort would be required in such a way that, when adjusting the seat belt 16*a*, the holding unit 36*a* would have to be shifted on the seat belt 16*a* and elements connected to the holding device 36*a* would have to move along. The base body 70*a* encompasses the fixed side 40*a* of the seat belt 16*a*. Herein the base body 70*a* and thus the holding device 36*a* are displaceable on the fixed side 40*a* of the seat belt 16*a*. Principally it would also be conceivable that the holding device 36*a* is partly implemented by a connection element 66*a*, 68*a* of the functional opening and closing unit 22*a*. In this case the operating element 34*a* would be connected to the functional opening and closing unit 22*a* but would not have any influence on an opening or closing of the seat belt 16*a* via the functional opening and closing unit 22*a*.

The functional unit 28*a* comprises a transfer element 42*a*. The transfer element 42*a* is provided for coupling the operating element 34*a* with an element that is to be triggered, in particular with the element that is to be triggered of the adjustment mechanism. The transfer element 42*a* couples the operating element 34*a* with the spring element of the adjustment mechanism, which is embodied as a gas pressure spring. The transfer element 42*a* transmits an actuation force exerted onto the operating element 34*a* to the spring element, which is embodied as a gas pressure spring and unblocks the spring element in an actuated state. The transfer element 42*a* is embodied as a Bowden wire. The transfer element 42*a*, which is embodied as a Bowden wire, comprises a wire rope which is provided for transferring a tension force and is encompassed by a sleeve which is stable in an extension direction. For a connection of the transfer element 42*a* to the seat belt 16*a*, the functional unit 28*a* comprises a guidance 44*a*. The guidance 44*a* fixedly connects the transfer element 42*a* to the seat belt 16*a*. Herein the guidance 44*a* is implemented as a guiding element which is embodied separate from the seat belt 16*a* and is connected to the seat belt 16*a*. The guidance 44*a* comprises herein a plurality of form-fit elements 72*a*, 74*a*, which are fixedly connected to the seat belt 16*a*. The form-fit elements 72*a*, 74*a* of the guidance 44*a* accommodate in a mounted state the transfer element 42*a* in a form-fit fashion. The form-fit elements 72*a*, 74*a* are herein each embodied as a closed loop through which the transfer element 42*a* is guided. Principally it is also conceivable that, for connecting the transfer element 42*a*, the form-fit elements 72*a*, 74*a* are embodied in a different manner which is deemed expedient by someone skilled in the art. Principally it is also conceivable that the guidance 44*a* comprises further form-fit elements 72*a*, 74*a* or that the guidance 44*a* is embodied by only one form-fit element which connects the transfer element 42*a* to the seat belt 16*a* over an entire extension.

In FIGS. 3 to 8 six further exemplary embodiments of the invention are shown. The following description and the drawings are substantially restricted to the differences between the exemplary embodiments, wherein as regards identically designated structural elements, in particular as regards structural elements with the same reference numerals, principally the drawings and/or the description of the other exemplary embodiments may be referred to as well, in particular of FIGS. 1 and 2. For distinguishing the exemplary embodiments, the letter a is added to the reference numerals of the exemplary embodiment of FIGS. 1 and 2. In the exemplary embodiments of FIGS. 3 to 8 the letter a has been replaced by the letters b to g.

FIG. 3 shows a seat device according to the invention in a second exemplary embodiment. The seat device comprises a first seat 10*b*. The seat 10*b* is mounted in an airplane cabin (not shown in detail) of an airplane. The seat 10*b*, which is embodied as a flight passenger seat, comprises a seat bottom 54*b* and a backrest 56*b* which is pivotably coupled with the seat bottom 54*b*. Herein the seat 10*b* is adjustable between a TTL position and a comfort position. For a seat adjustment of the seat 10*b* between the TTL position and the comfort position, the seat 10*b* comprises an adjustment mechanism, which is not shown in detail. The adjustment mechanism comprises a spring element. The spring element is embodied as a gas pressure spring. For the purpose of securing a passenger sitting on the seat 10*b*, the seat device comprises a seat belt 16*b*. The seat belt 16*b* is fixedly connected to the seat 10*b*. The seat belt 16*b* spans in a closed state across the seat bottom 54*b* of the seat 10*b*. For opening and closing the seat belt 16*b*, the seat belt 16*b* comprises a functional opening and closing unit 22*b*. The seat device comprises one functional unit 28*b* per seat 10*b*. The functional unit 28*b* is allocated to the corresponding seat 10*b*, which is embodied as a flight passenger seat. The functional unit 28*b* is herein embodied in such a way that it differs from the corresponding functional opening and closing unit 22*b* of the seat belt 16*b* of the seat 10*b*. The functional unit 28*b* is herein connected to the seat belt 16*b* of the seat 10*b*. The functional unit 28*b* is embodied as an operating unit. Via the functional unit 28*b*, which is embodied as an operating unit, a passenger sitting on the seat 10*b* can operate at least part of a function of the seat 10*b*, which is embodied as a flight passenger seat. The functional unit 28*b*, which is embodied as an operating unit, comprises an operating element 34*b*. The operating element 34*b* is provided to be actuated by a person, in particular by the passenger sitting on the seat 10*b*. The operating element 34*b* is embodied as a mechanical press button. The operating element 34b is also embodied as a recline button 38b. The functional unit 28b is to a major part implemented identically to the functional unit of the first exemplary embodiment.

The functional unit 28b comprises a holding device 36b. In a mounted state, the holding device 36b connects the operating element 34b of the functional unit 28b to the seat belt 16b. Herein the holding device 36b is connected to the seat belt 16b stationarily, thus differing from the first exemplary embodiment. The holding device 36b is herein connected to the seat belt 16b in such a way that it is not displaceable. The functional unit 28b comprises a transfer element 42b. The transfer element 42b is provided for coupling the operating element 34b with an element that is to be triggered, in particular the element of the adjustment mechanism that is to be triggered. The transfer element 42b is implemented as a Bowden wire, like in the first exemplary embodiment. For connecting the transfer element 42b to the seat belt 16b, the functional unit 28b comprises a guidance 44b. The guidance 44b fixedly connects the transfer element 42b to the seat belt 16b.

As a difference to the first exemplary embodiment, the guidance 44b is embodied as a guiding element integrated in the seat belt 16b. The guidance 44b is embodied in a one-part implementation with the seat belt 16b. Herein the guidance 44b is implemented as a pocket incorporated in the seat belt 16b. The guidance 44b is herein arranged on a side of the seat belt 16b. Herein it is, for example, also conceivable that a hose element has been sewed into the seat belt 16b, thus implementing the guidance 44b integrated in the seat belt 16b. By means of the guidance 44b integrated in the seat belt 16b, the transfer element 42b is especially advantageously mountable to the seat belt 16b. The transfer element 42b, which is arranged in the guidance 44b, is arranged at the seat belt 16b in a non-bothersome fashion. By way of the integrated guidance 44b, the transfer element 42b is securely arranged on the seat belt 16b. This results in advantageously counteracting an inadvertent damaging of the transfer element 42b by a passenger.

FIG. 4 shows a seat device according to the invention in a third exemplary embodiment. The seat device comprises a first seat 10c. The seat 10c is mounted in an airplane cabin (not shown in detail) of an airplane. The seat 10c, which is embodied as a flight passenger seat, comprises a seat bottom 54c and a backrest 56c which is pivotally coupled to the seat bottom 54c. Herein the seat 10c is adjustable between a TTL position and a comfort position. For a seat adjustment of the seat 10c between the TTL position and the comfort position, the seat 10c comprises an adjustment mechanism, which is not shown in detail. The adjustment mechanism comprises a spring element. The spring element is implemented as a gas pressure spring. For securing a passenger sitting on the seat 10c, the seat device comprises a seat belt 16c. The seat belt 16c is fixedly connected to the seat 10c. The seat belt 16c spans in a closed state across the seat bottom 54c of the seat 10c. For opening and closing the seat belt 16c, the seat belt 16c comprises a functional opening and closing unit 22c. The seat device comprises one functional unit 28c per seat 10c. The functional unit 28c is allocated to the corresponding seat 10c, which is embodied as a flight passenger seat. The functional unit 28c is herein implemented in such a way that it differs from the corresponding functional opening and closing unit 22c of the seat belt 16c of the seat 10c. The functional unit 28c is herein connected to the seat belt 16c of the seat 10c. The functional unit 28c is implemented as an operating unit. Via the functional unit 28c, which is embodied as an operating unit, a passenger sitting on the seat 10c can operate at least part of a function of the seat 10c, which is embodied as a flight passenger seat.

The functional unit 28c comprises an operating element 34c. The operating element 34c is provided for being actuated by a person, in particular by the passenger sitting on the seat 10c. By means of the operating element 34c, the adjustment mechanism of the seat 10c, which is not shown in detail, can be operated by the passenger. The operating element 34c is herein embodied as a pull element. For actuating the adjustment mechanism, that is for the purpose of unlocking the seat 10c for adjusting the seat bottom 54c with respect to the backrest 56c, a tension force can be applied by a passenger to the operating element 34c, which is embodied as a pull element. The functional unit 28c comprises a transfer element 42c, which transmits the tension force from the operating element 34c, which is embodied as a pull element, to the adjustment mechanism. Herein the transfer element 42c is embodied in a one-part implementation with the operating element 34c, which is embodied as a pull element. The transfer element 42c is implemented of a fabric tape 76c. It is herein conceivable, for example, that the fabric tape 76c is implemented of a same fabric as the seat belt 16c. Principally it is of course also conceivable that the fabric tape 76c is implemented of a different fabric than the seat belt 16c, in particular of a fabric that is less tear resistant. On a first end the fabric tape 76c is connected to the adjustment mechanism. On a second end the fabric tape 76c forms a loop implementing the operating element 34c, which is embodied as a pull element. Principally it is also conceivable that the operating element 34c, which is embodied as a pull element, is implemented by a differently embodied element which can be gripped by a passenger for pulling on it, e.g. as a hook element or ring element, which is fixedly connected to the fabric tape 76c. Herein it is additionally conceivable that the operating element 34c, which is embodied as a pull element, features a differing color and is thus easily recognizable by a passenger. It is thus conceivable, for example, that the fabric tape 76c features, in a region in which it forms the loop, a signal color, e.g. red.

For connecting the transfer element 42c and the operating element 34c to the seat belt 16c, the functional unit 28c comprises a guidance 44c. The guidance 44c fixedly connects the transfer element 42c to the seat belt 16c. The guidance 44c is embodied as a guiding element, which is integrated in the seat belt 16c. The guidance 44c is embodied in a one-part implementation with the seat belt 16c. Herein the guidance 44 is implemented as a pocket incorporated in the seat belt 16c. The guidance 44c is herein arranged in the seat belt 16c centrally. The fabric tape 76c is arranged substantially in the guidance 44c. The fabric tape 76c protrudes, with the loop implementing the operating element 34c of the functional unit 28c, from an opening 78c in the guidance 44c. The opening 78c of the guidance 44c, through which the loop of the fabric tape 76c implementing the operating element 34c protrudes, is herein arranged on an end of a fixed side 40c of the seat belt 16c which faces towards a connection element 66c of the functional opening and closing unit 22c. For actuating the adjustment mechanism and thus for an adjustment of the seat 10c, a passenger may grip the operating element 34c, which is implemented as a loop of the fabric tape 76c, and may pull on it in order to exert a tension force onto the adjustment mechanism and then to adjust the seat 10c by way of shifting a weight. Principally it is also conceivable that the guidance 44c is embodied by a cuff pulled over the seat belt 16c. It is herein conceivable that the cuff is, for example, made of a silicone.

The cuff would herein be preferably guided over the entire length of the fixed side 40c of the seat belt 16c. Herein the cuff would completely encompass the seat belt 16c. The guidance 44c would herein be integrated in the cuff, as a result of which the seat belt 16c could remain unchanged in comparison to a seat belt known from the prior art.

FIG. 5 shows a seat device according to the invention in a fourth exemplary embodiment. The seat device comprises a first seat 10d. The seat 10d is mounted in an airplane cabin (not shown in detail) of an airplane. The seat 10d, which is embodied as a flight passenger seat, comprises a seat bottom 54d and a backrest 56d which is pivotably coupled with the seat bottom 54d. Herein the seat 10d is adjustable between a TTL position and a comfort position. For a seat adjustment of the seat 10d between the TTL position and the comfort position, the seat 10d comprises an adjustment mechanism, which is not shown in detail. The adjustment mechanism comprises a spring element. The spring element is implemented as a gas pressure spring. For securing a passenger sitting on the seat 10d, the seat device comprises a seat belt 16d. The seat belt 16d is fixedly connected to the seat 10d. The seat belt 16d spans in a closed state across the seat bottom 54d of the seat 10d. For opening and closing the seat belt 16d, the seat belt 16d comprises a functional opening and closing unit 22d. The seat device comprises one functional unit 28d per seat 10d. The functional unit 28d is allocated to the corresponding seat 10d, which is embodied as a flight passenger seat. The functional unit 28d is herein implemented in such a way that it differs from the corresponding functional opening and closing unit 22d of the seat belt 16d of the seat 10d. The functional unit 28d is herein connected to the seat belt 16d of the seat 10d. The functional unit 28d is implemented as an operating unit. Via the functional unit 28d, which is embodied as an operating unit, a passenger sitting on the seat 10d can operate at least part of a function of the seat 10d, which is embodied as a flight passenger seat.

The functional unit 28d comprises an operating element 34d. The operating element 34d is provided for being actuated by a person, in particular by the passenger sitting on the seat 10d. By means of the operating element 34d, the adjustment mechanism of the seat 10d, which is not shown in detail, can be operated by the passenger. The operating element 34d is herein embodied as a pull element. For actuating the adjustment mechanism, that is for the purpose of unlocking the seat 10d for adjusting the seat bottom 54d with respect to the backrest 56d, a tension force can be applied by a passenger to the operating element 34d, which is embodied as a pull element. The functional unit 28d comprises a transfer element 42d, which transfers the tension force from the operating element 34d, which is embodied as a pull element, to the adjustment mechanism. Herein the transfer element 42d is embodied in a one-part implementation with the operating element 34d, which is embodied as a pull element, and the seat belt 16d. The seat belt 16d embodies the operating element 34d and the transfer element 42d in a one-part implementation. Herein a fixed side 40d of the seat belt 16d embodies the operating element 34d and the transfer element 42d in a one-part implementation. The fixed side 40d of the seat belt 16d is for this purpose directly connected to the adjustment mechanism with a first end. On a second end, the fixed side 40d of the seat belt 16d comprises a connection element 66d. For actuating the adjustment mechanism and thus for an adjustment of the seat 10d, a passenger may grip the fixed side 40d of the seat belt 16d and pull on it for thus applying a tension force to the adjustment mechanism and then adjusting the seat 10d by shifting a weight.

FIG. 6 shows a seat device according to the invention in a fifth exemplary embodiment. The seat device comprises a first seat 10e. The seat 10e is mounted in an airplane cabin (not shown in detail) of an airplane. The seat 10e, which is embodied as a flight passenger seat, comprises a seat bottom 54e and a backrest 56e which is pivotably coupled to the seat bottom 54e. Herein the seat 10e is adjustable between a TTL position and a comfort position. For a seat adjustment of the seat 10e between the TTL position and the comfort position, the seat 10e comprises an adjustment mechanism, which is not shown in detail. The adjustment mechanism comprises a blocking module which is able to block the adjustment mechanism for locking the seat 10e in a position or to trigger the adjustment mechanism, as a result of which the seat 10e can be adjusted between the TTL position and the comfort position. The blocking module is herein embodied as an electrically actuable module. For this purpose the blocking module comprises an electro-magnetic blocking element. Principally it is also conceivable that the blocking module comprises a different electrically and/or electronically actuable blocking element. For securing a passenger sitting on the seat 10e, the seat device comprises a seat belt 16e. The seat belt 16e is fixedly connected to the seat 10e. The seat belt 16e spans in a closed state across the seat bottom 54e of the seat 10e. For opening and closing the seat belt 16e, the seat belt 16e comprises a functional opening and closing unit 22e. The seat device comprises one functional unit 28e per seat 10e. The functional unit 28e is allocated to the corresponding seat 10e, which is embodied as a flight passenger seat. The functional unit 28e is herein embodied in such a way that it differs from the corresponding functional opening and closing unit 22e of the seat belt 16e of the seat 10e. The functional unit 28e is herein connected to the seat belt 16e of the seat 10e. The functional unit 28e is embodied as an operating unit. Via the functional unit 28e, which is embodied as an operating unit, a passenger sitting on the seat 10e can operate at least part of a function of the seat 10e, which is embodied as a flight passenger seat.

The functional unit 28e comprises a first operating element 34e. The operating element 34e is embodied as an electrical operating element. The operating element 34e, which is embodied as an electrical operating element, is provided for controlling the blocking module of the adjustment mechanism. For coupling the operating element 34e, which is embodied as an electrical operating element, with the adjustment mechanism, the functional unit 28e comprises a transfer element 42e. The transfer element 42e is implemented as an electrical cable. The transfer element 42e is in the present case electrically coupled with the operating element 34e and the adjustment mechanism. When the operating element 34e is actuated by a passenger, an electrical signal is transferred to the blocking module of the adjustment mechanism, and the adjustment mechanism, and thus the seat 10e, is unblocked and can be adjusted by the passenger. If the operating element 34e is not actuated, no electrical signal is transferred to the adjustment mechanism and the seat 10e is locked.

The functional unit 28e comprises further operating elements 82e, 84e, 86e. The operating elements 82e, 84e, 86e are also embodied as electrical operating elements. The operating elements 82e, 84e, 86e, which are embodied as electrical operating elements, are provided for controlling a seat electronics of the seat 10e. Via the operating elements 82e, 84e, 86e a passenger can operate the seat electronics of the seat 10e. The operating element 82e is implemented as a rocker switch. Via the operating element 82e, which is implemented as a rocker switch, a sound volume regulation for an entertainment system of the seat 10e can be operated. The operating element 84e is implemented as an electrical press button. Via the operating element 84e the entertainment system of the seat 10e can be operated. Herein a variety of functions of the entertainment system, e.g. various audio and/or video programs, can be switched through by pressing the operating element 84e. The operating element 86e is implemented as a service button. By pressing the operating element 86e, which is implemented as a service button, the passenger can ask a service member of an airplane to come to him. The further operating elements 82e, 84e, 86e are coupled with a seat electronics of the seat 10e via the transfer element 42e. For this purpose, the transfer element 42e, which is embodied as an electrical cable, comprises a plurality of conductors. Principally it is also conceivable that the further operating elements 82e, 84e, 86e control other electrical and/or electronic functions of the seat 10e, e.g. an electrical seat adjustment. Principally it is also conceivable that the functional unit 28e comprises further operating elements which are implemented as electric operating elements and are provided for electric and/or electronic control of the seat 10e. The functional unit 28e further comprises a plug element 46e. The plug element 46e is embodied as an audio connector. Via the plug element 46e a passenger can connect audio output devices, e.g. earphones. The plug element 46e is herein connected to the seat electronics via the transfer element 42e, which is embodied as a cable. Principally it is also conceivable that the plug element 46e is embodied as a differently implemented plug element, e.g. as a USB connector. Herein it is principally also conceivable that the functional unit 28e comprises a plurality of differently implemented plug elements 46e.

The functional unit 28e comprises a holding device 36e. The holding device 36e is connected to the seat belt 16e. Herein the holding device 36e is fixedly connected to the seat belt 16e. Principally it is also conceivable that the holding device 36e is arranged on the seat belt 16e in such a way that it is displaceable. The holding device 36e comprises a base body 70e, which encompasses the seat belt 16e in a mounted state. The holding device 36e is provided for connecting the operating elements 34e, 82e, 84e, 86e and the plug element 46e to the seat belt 16e. For this purpose the operating elements 34e, 82e, 84e, 86e and the plug element 46e are inset in the base body 70e of the holding device 36e. For connecting the transfer element 42e to the seat belt 16e, the functional unit 28e comprises a guidance 44e. The guidance 44e fixedly connects the transfer element 42e to the seat belt 16e. The guidance 44e is herein integrated in the seat belt 16e.

FIG. 7 shows a seat device according to the invention in a sixth exemplary embodiment. The seat device comprises a first seat 10f. The seat 10f is mounted in an airplane cabin (not shown in detail) of an airplane. The seat 10f, which is embodied as a flight passenger seat, comprises a seat bottom 54f and a backrest 56f which is pivotably coupled to the seat bottom 54f. Herein the seat 10f is adjustable between a TTL position and a comfort position. For a seat adjustment of the seat 10f between the TTL position and the comfort position, the seat 10f comprises an adjustment mechanism, which is not shown in detail. The adjustment mechanism comprises a spring element. The spring element is implemented as a gas pressure spring. For securing a passenger sitting on the seat 10f, the seat device comprises a seat belt 16f. The seat belt 16f is fixedly connected to the seat 10f. The seat belt 16f spans in a closed state across the seat bottom 54f of the seat 10f. For opening and closing the seat belt 16f, the seat belt 16f comprises a functional opening and closing unit 22f. The seat device comprises one functional unit 28f per seat 10f. The functional unit 28f is allocated to the corresponding seat 10f, which is embodied as a flight passenger seat. The functional unit 28f is herein embodied in such a way that it differs from the corresponding functional opening and closing unit 22f of the seat belt 16f of the seat 10f. The functional unit 28f is herein connected to the seat belt 16f of the seat 10f. The functional unit 28f comprises a stowage element 48f. The stowage element 48f is provided for allowing a passenger to arrange elements, in particular small elements, e.g. cell phones, music reproduction devices, pens or the like. The stowage element 48f is herein embodied as a pocket. The stowage element 48f, which is embodied as a pocket, is fixedly connected to the seat belt 16f. The stowage element 48f is in the present case sewn with the seat belt 16f. Principally it is also conceivable that the stowage element 48f is connected to the seat belt 16f in another way, e.g. via an adhesive bond. The stowage element 48f comprises a closing unit 80f. The closing unit 80f is provided for closing off the stowage element 48f. The closing unit 80f is herein embodied by a zip. Principally it is also conceivable that the closing unit 80f is implemented in another way that is deemed expedient by someone skilled in the art, for example comprising a hook-and-loop closure or buttons. The stowage element 48f is herein arranged on a fixed side 40f of the seat belt 16f. Principally it is also conceivable that the stowage element 48f is arranged on a variable side 64f of the seat belt 16f. Herein it is principally also conceivable that the functional unit 28f comprises further stowage elements 48f, which may be arranged optionally on the fixed side 40f and/or on the variable side 64f of the seat belt 16f.

FIG. 8 shows the seat device according to the invention in a seventh exemplary embodiment. The seat device comprises a first seat 10g. The seat 10g is mounted in an airplane cabin (not shown in detail) of an airplane. The seat 10g, which is embodied as a flight passenger seat, comprises a seat bottom 54g and a backrest 56g which is pivotably coupled to the seat bottom 54g. Herein the seat 10g is adjustable between a TTL position and a comfort position. For a seat adjustment of the seat 10g between the TTL position and the comfort position, the seat 10g comprises an adjustment mechanism, which is not shown in detail. The seat 10g furthermore comprises armrests 60g, 62g, which are respectively arranged laterally next to the seat bottom 54g. The armrests 60g, 62g are respectively pivotably connected to seat dividers of the seat 10g, which are not shown in detail. The armrests 60g, 62g are herein respectively arranged laterally with respect to the backrest 56g. For securing a passenger sitting on the seat 10g, the seat device comprises a seat belt 16g. The seat belt 16g is fixedly connected to the seat 10g. The seat belt 16g spans in a closed state across the seat bottom 54g of the seat 10g. For opening and closing the seat belt 16g, the seat belt 16g comprises a functional opening and closing unit 22g. The seat belt 16g comprises a first fixed side 40g and a second variable side 64g. In a closed state the fixed side 40g and the variable side 64g of the seat belt 16g are fixedly connected to each other via the functional opening and closing unit 22g. The seat device comprises one functional unit 28g per seat 10g. The functional unit 28g is allocated to the corresponding seat 10g, which is embodied as a flight passenger seat. The functional unit 28g is herein embodied in such a way that it differs from the corresponding functional opening and closing unit 22g of the seat belt 16g of the seat 10g. The functional unit 28*g* is herein connected to the seat belt 16*g* of the seat 10*g*. The functional unit 28*g* is implemented as an operating unit. Via the functional unit 28*g*, which is implemented as an operating unit, a passenger sitting on the seat 10*g* can operate at least part of a function of the seat 10*g*, which is embodied as a flight passenger seat. The functional unit 28*g*, which is embodied as an operating unit, comprises an operating element 34*g*. The operating element 34*g* is provided to be operated by a person, in particular by the passenger sitting on the seat 10*g*. The operating element 34*g* is embodied as a mechanical press button. The operating element 34*g* is also embodied as a recline button 38*g*. The functional unit 28*g* is to a major part implemented identically to the functional unit of the first exemplary embodiment.

Differently from the preceding exemplary embodiments, the seat device comprises a seat belt holding device 90*g*. Via the seat belt holding device 90*g* the seat belt 16*g* can be fixated to the seat 10*g*, in case of non-use, in a non-bothersome position. Herein the first fixed side 40*g* and the second variable side 64*g* can be connected to the seat 10*g* independently from each other. For connecting the first fixed side 40*g* and the second variable side 64*g* of the seat belt 16*g*, the seat belt holding device 90*g* comprises respectively one holding element 92*f*, 94*g*. Herein respectively one holding element 92*g*, 94*g* is fixedly connected to the armrest 60*g*, 62*g*. The holding elements 92*g*, 94*g* are herein embodied as simple form-fit elements, by means of which respectively one side of the seat belt 16*g* is connectable. The holding elements 92*g*, 94*g* are herein embodied as hooks, which may be hooked into the respective side 40*g*, 64*g* of the seat belt 16*g*. The holding elements 92*g*, 94*g*, which are embodied as hooks, are herein respectively arranged on an inner side of the armrests 60*g*, 62*g*. Principally it would also be conceivable that the holding elements 92*g*, 94*g* are arranged on an underside or an outer side of the respective armrest 60*g*, 62*g*. Principally it is also conceivable that the holding elements 92*g*, 94*g* are embodied in a different fashion which is deemed expedient by someone skilled in the art. It is herein conceivable that the holding elements 92*g*, 94*g* are embodied as differently implemented form-fit elements, e.g. clip elements. Principally it is also conceivable that the holding elements 92*g*, 94*g* are implemented by hook-and-loop closure elements or magnetic holding elements, which are attached to the armrests 60*g*, 62*g*. Via the holding elements 92*g*, 94*g* the sides 40*g*, 64*g* of the seat belt 16*g* can be connected to the armrests 60*g*, 62*g* in case of non-use, as a result of which a passenger can easily and intuitively reach in particular the fixed side 40*g*, which the functional unit 28*g* is connected to, for adjusting the seat 10*g*.

REFERENCE NUMERALS

10 seat
12 seat
14 seat
16 seat belt
18 seat belt
20 seat belt
22 functional opening and closing unit
24 functional opening and closing unit
26 functional opening and closing unit
28 functional unit
30 functional unit
32 functional unit
34 operating element
36 holding device
38 recline button
40 fixed side
42 transfer element
44 guidance
46 plug element
48 stowage element
52 seat row
54 seat bottom
56 backrest
58 cabin floor
60 armrest
62 armrest
64 variable side
66 connection element
68 connection element
70 base body
72 form-fit element
74 form-fit element
76 fabric tape
78 opening
80 closing unit
82 operating element
84 operating element
86 operating element
88 mounting unit
90 seat belt holding device
92 holding element
94 holding element

The invention claimed is:

1. A seat device with a seat, in particular a flight passenger seat, with a seat belt and with at least one functional unit, which at least substantially differs from a functional opening and closing unit of the seat belt, wherein
   the at least one functional unit is at least connected to the seat belt and/or is at least partly integrated in the seat belt,
   the at least one functional unit is embodied as an operating unit comprising at least one operating element, wherein the operating element is embodied as a pull element,
   the at least one functional unit comprises at least one transfer element for a coupling of the operating element with an element that is to be triggered, and
   the transfer element is coupled with the seat belt and the transfer element is an element for transferring a force and/or movement.

2. The seat device according to claim 1, wherein the at least one functional unit comprises a holding device connecting the functional unit to the seat belt.

3. The seat device according to claim 2, wherein the holding device is connected to the seat belt in such a way that it is displaceable.

4. The seat device according to claim 2, wherein the holding device is arranged on a fixed side of the seat belt.

5. The seat device according to claim 2, wherein the holding device is fixedly connected to the seat belt.

6. The seat device according to claim 1, wherein the at least one functional unit comprises at least one guidance connecting the transfer element to the seat belt.

7. The seat device according to claim 6, wherein the guidance is embodied as a guiding element which is implemented separate from the seat belt and is connected to the seat belt.

8. The seat device according to claim 6, wherein the guidance is embodied as a guiding element which is integrated in the seat belt.

9. The seat device according to claim 1, wherein the operating element is embodied as a mechanical press button.

10. The seat device according to claim 1, wherein the operating element is embodied as an electrical, electronic or electro-magnetic operating element.

11. The seat device according to claim 1, wherein the seat belt embodies the operating element and the transfer element in a one-part implementation and is provided for triggering a seat adjustment.

12. The seat device according to claim 1, wherein the operating element is provided for actuating a seat adjustment.

13. The seat device according to claim 1, wherein the functional unit comprises at least one plug element.

14. The seat device according to claim 1, wherein the functional unit comprises at least one stowage element.

15. A functional unit for usage in a seat device according to claim 1.

16. A seat belt for a seat device according to claim 1, comprising at least one connected and/or integrated functional unit.

17. A seat device with a seat, in particular a flight passenger seat, with a seat belt and with at least one functional unit, which at least substantially differs from a functional opening and closing unit of the seat belt, wherein the at least one functional unit is at least connected to the seat belt and/or is at least partly integrated in the seat belt, the at least one functional unit is embodied as an operating unit comprising at least one operating element, the operating element is embodied as a pull element, the functional unit comprises a transfer element, which is provided for coupling the operating element with an element that is to be triggered, and the seat belt embodies the operating element and the transfer element in a one-part implementation and is provided for triggering a seat adjustment.

18. A seat device with a seat, in particular a flight passenger seat, with a seat belt and with at least one functional unit, which at least substantially differs from a functional opening and closing unit of the seat belt, wherein the at least one functional unit is at least connected to the seat belt and/or is at least partly integrated in the seat belt, the at least one functional unit is embodied as an operating unit comprising at least one operating element, the operating element is embodied as a mechanical press button, wherein the mechanical press button is adapted to transfer a mechanical force for actuating an element that is to be triggered via actuation, the at least one functional unit comprises at least one transfer element for a coupling of the operating element with the element that is to be triggered, and the transfer element is coupled with the seat belt and the transfer element is an element for transferring a force and/or movement, wherein the transfer element is provided to transfer an operating force originating from the operating element and provided to actuate the element that is to be triggered.

* * * * *